United States Patent
Reil

(10) Patent No.: US 8,113,252 B2
(45) Date of Patent: Feb. 14, 2012

(54) TIRE TRACTION DEVICE WITH GUIDED RADIAL TENSIONING ARMS

(75) Inventor: London Reil, Bend, OR (US)

(73) Assignee: London Reil, Bend, OR (US)

( * ) Notice: Subject to any disclaimer, the term of this patent is extended or adjusted under 35 U.S.C. 154(b) by 117 days.

(21) Appl. No.: 12/605,242

(22) Filed: Oct. 23, 2009

(65) Prior Publication Data

US 2011/0094643 A1    Apr. 28, 2011

(51) Int. Cl.
B60C 27/10    (2006.01)
B60C 27/14    (2006.01)

(52) U.S. Cl. ............. 152/216; 152/225 R; 152/226
(58) Field of Classification Search .......... 152/170, 152/213 R, 216, 225 R, 226
See application file for complete search history.

(56) References Cited

U.S. PATENT DOCUMENTS

| | | | | |
|---|---|---|---|---|
| 2,212,076 A * | 8/1940 | Rollings | | 152/216 |
| 2,575,263 A * | 11/1951 | Eisenhauer, Sr. | | 152/225 R |
| 2,729,261 A | 1/1956 | Rucker | | |
| 3,847,196 A * | 11/1974 | Gomez | | 152/226 |
| 4,862,936 A * | 9/1989 | McDonough | | 152/216 |
| 5,076,335 A * | 12/1991 | Koshi | | 152/226 |
| 6,053,227 A * | 4/2000 | Robeson | | 152/225 R |
| 6,450,224 B1 * | 9/2002 | Ward | | 152/218 |
| 6,983,778 B1 * | 1/2006 | Pitts et al. | | 152/225 R |
| 2004/0089385 A1 | 5/2004 | Kahen | | |
| 2009/0056848 A1 * | 3/2009 | Maltezos | | 152/216 |
| 2009/0151834 A1 * | 6/2009 | Bozkurt et al. | | 152/213 R |
| 2010/0170603 A1 * | 7/2010 | Polyakovics | | 152/225 R |

FOREIGN PATENT DOCUMENTS

| | | |
|---|---|---|
| JP | 01052512 | 2/1989 |
| JP | 02070513 | 3/1990 |
| KR | 200262037 | 2/2002 |
| KR | 200323574 | 8/2003 |
| WO | WO-2009032240 | 3/2009 |

OTHER PUBLICATIONS

Spikes-Spider, http://www.spikes-spiders.com/, accessed and printed on Oct. 19, 2009, 3 pgs.
International Search Report and Written Opinion for PCT Application No. PCT/US2010/053631 dated Aug. 2, 2011, 8 pages.

* cited by examiner

*Primary Examiner* — Kip T Kotter
(74) *Attorney, Agent, or Firm* — Blakely, Sokoloff, Taylor & Zafman

(57) ABSTRACT

A tire traction device having a plurality of radial tensioning arms extending radially from a central hub, a fraction pad coupled to each of the radial tensioning arms at an end opposite the central hub and the radial tensioning arms including rigid bodies movable in a radial direction relative to the central hub along radii spaced about the central hub at fixed angular positions to provide tensioning of the traction pads against a tire. A rotatable tensioner may be disposed within the central hub, the rotatable tensioner including curved guide vanes to which the tensioning arms are coupled. Each of the tensioning arms includes a pin configured to be seated into, and slide within, the curved channel so as to remain in a substantially constant angular position relative to the outer circumference of the central hub while being displaced radially in response to a rotation of the rotatable tensioner.

13 Claims, 12 Drawing Sheets

TIRE TRACTION DEVICE WITH GUIDED RADIAL TENSIONING ARMS

BACKGROUND OF THE INVENTION

1. Field of the Invention

The present invention relates to tire traction enhancement devices for a vehicle wheel assembly. More particularly, the present invention relates to a tire traction enhancement device with radial tensioning arms.

2. Discussion of Related Art

Tire traction enhancement devices, referred herein as tire traction devices, including those commonly known as tire chains, provide increased traction to a vehicle wheel assembly. When a tire of a wheel assembly provides inadequate traction for a vehicle, a tire traction device may be installed onto the tire by the operator of the vehicle and employed until road conditions improve to the point where the tire traction device becomes unnecessary. Thus, it is important that the tire traction device be simple to install and remove.

Many tire traction devices, when positioned flat on the ground, are ladder-like, having two parallel side chains connected by a plurality of transverse traction chains. The length of the side chains is generally approximately equal to the circumference of the tire, or slightly less, while the length of the traction chains is generally slightly greater than the tire tread width. While various tire traction devices may employ cables or plastic straps in place of chains, the assembly of such tire traction devices is similar to those employing chains.

To install a typical tire traction device, it is first draped over the top of the tire. The length of the traction chains is such that the side chains form a circle concentric with and adjacent to the sidewall of the tire. A tire traction device securing apparatus is then attached to the side chains to remove the slack from the side and traction chains to secure the tire traction device to the tire. Adhering to this general design, conventional tire traction devices have generally remained difficult to install by the majority of automobile drivers. Furthermore, with the advent of low profile tires and reduce wheel well clearances even the skilled installer may be unable to install a conventional tire traction device without the assistance of a lift or jack as the inner tire sidewall and/or tire contact surface may be otherwise inaccessible. A tire traction device that is easier to install by the lay person, compatible with low-clearance automobiles, and non-detrimental to a wheel's finish would therefore be advantageous.

SUMMARY OF THE INVENTION

Described herein is a tire traction device having a plurality of radial tensioning arms extending from a central hub; each of the plurality of radial tensioning arms may be removably attached to a tire to provide a plurality of tension sources directed toward the central hub of the traction device to secure the tire fraction device to a tire. A traction pad is disposed to an end of each tensioning arm opposite the central hub. The plurality of radial tensioning arms are guided by the hub as they are displaced beyond the central hub to lengths greater than the radius of the central hub to accommodate attachment and tensioning of the traction pads to the tire. In an embodiment, arm guides within the central hub maintain a substantially fixed angular spacing between each of the plurality of tensioning arms as the arms are extended and/or retracted from/to the central hub along a radius extending from the hub center. In a further embodiment, the traction pad and the radial tensioning arm extending beyond the central hub are rigid bodies to extend in a radial direction outward from the hub at substantially the same angular position about the hub as provided by the arm guides. In a further embodiment, the radial tensioning arm is coupled to a flexible body contained within the central hub which is to compress in a radial direction inward independently from other tensioning arms to accommodate tire compression. In an embodiment, each of the plurality of radial tensioning arms is extended or refracted (tensioned) in unison to a same radial length from the central hub while each tensioning arm remains at a substantially fixed radial position about the central hub. In one embodiment, a rotation of a portion of the central hub displaces the radial tensioning arms along their respective radii while each tensioning arm remains at a substantially fixed radial position about the central hub. In a further embodiment, the central hub is configured to retract a radial tensioning arm along a radius in response to a rotation in a first direction (e.g., clockwise) and extend out a radial tensioning arm along the radius in response to a rotation in a second direction, opposite the first (e.g., counter-clockwise).

BRIEF DESCRIPTION OF THE DRAWINGS

The present invention is illustrated by way of example, and not limitation, in the figures of the accompanying drawings in which.

DETAILED DESCRIPTION OF THE PRESENT INVENTION

In various embodiments, tire traction devices are described with reference to figures. However, certain embodiments may be practiced without one or more of these specific details, or in combination with other known methods and materials. In the following description, numerous specific details are set forth, such as specific materials and dimensions, etc., in order to provide a thorough understanding of the present invention. In other instances, well-known aspects and features have not been described in particular detail to avoid unnecessarily obscuring the present invention. Reference throughout this specification to "an embodiment" means that a particular feature, structure, material, or characteristic described in connection with the embodiment is included in at least one embodiment of the invention. Thus, the appearances of the phrase "in an embodiment" in various places throughout this specification are not necessarily referring to the same embodiment of the invention. Furthermore, the particular features, structures, materials, or characteristics may be combined in any suitable manner in one or more embodiments.

The terms "over," "under," "between," and "on" as used herein refer to a relative position of one member with respect to other members. As such, for example, one member disposed over or under another member may be directly in contact with the other member or may have one or more intervening members. Moreover, one member disposed between members may be directly in contact with the two members or may have one or more intervening members. In contrast, a first member "on" a second member is in contact with that second member. Additionally, the relative position of one member with respect to other members is provided assuming operations are performed relative to a substrate without consideration of the absolute orientation of the substrate. For example, the terms "top" and "bottom" are to be understood as merely convenient labels describing only a relative physical relationship, and as such, "top" and "bottom" components may generally swap position while still achieving the same technical effect.

Figure 1A:
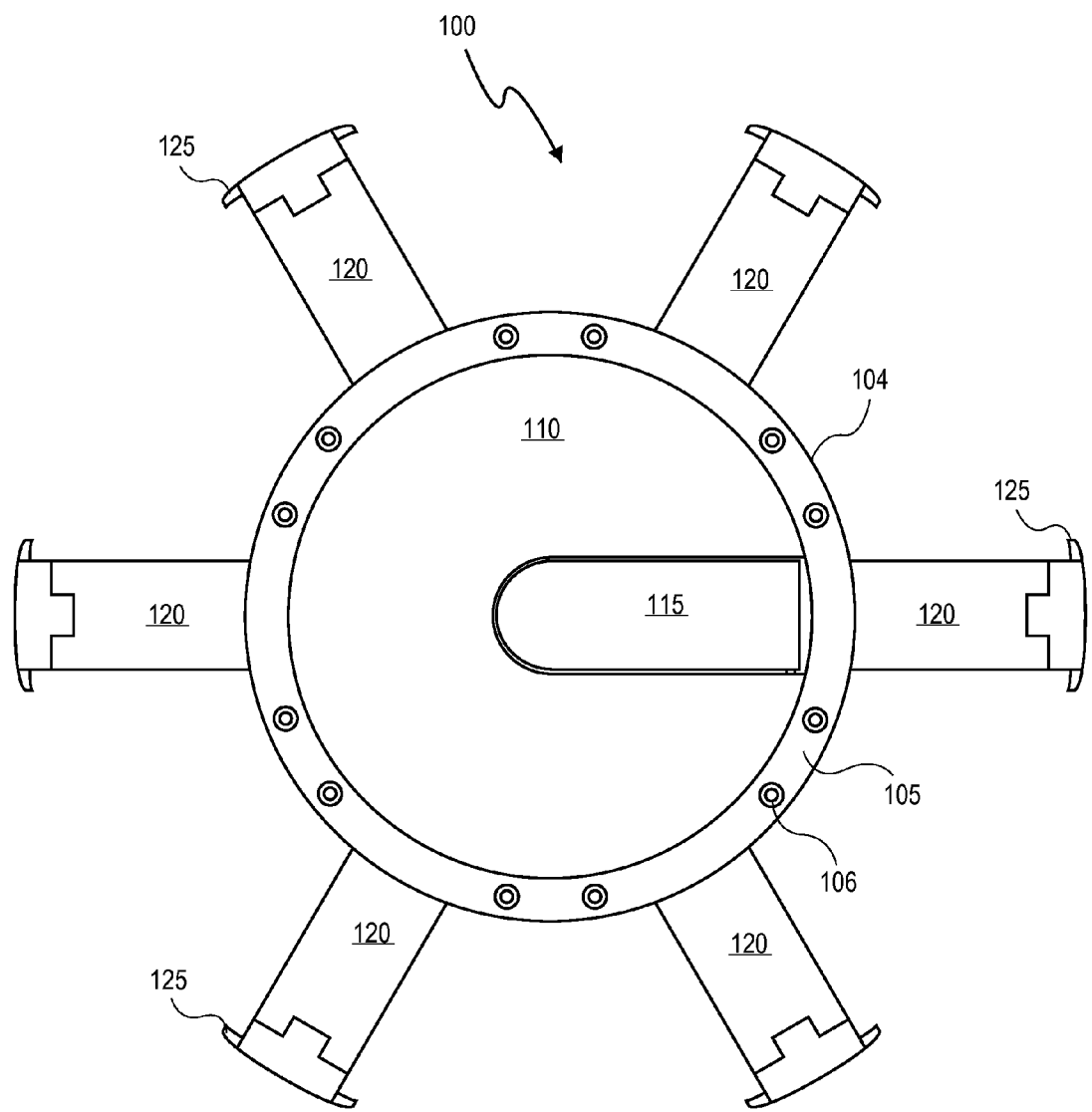
FIG. 1A depicts a plan view illustrating a front exterior of a tire traction device, in accordance with an embodiment of the present invention.

FIG. 1A depicts a plan view illustrating a front exterior of an exemplary tire traction device 100 in an uninstalled state (e.g., off a tire), in accordance with an embodiment of the present invention. The tire traction device 100 includes a central hub 104 which is rigid body and a plurality of radial tensioning arms 120 extending radially from the central hub 104. Each of the radial tensioning arms 120 is also a rigid body capable of supporting its own weight without significant deflection. At an end opposite the central hub 104 a fraction pad 125 is coupled to each of the radial tensioning arms 120. At ends opposite the traction pad 125, the radial tensioning arms 120 are coupled to the central hub. The portions of the central hub visible in FIG. 1A include an outer ring 105, the outer edge of which defines the outer diameter of the central hub 104, a cover plate 110 and a tensioning handle 115. In particular embodiments, one or both of the tensioning handle 115 and the cover plate 110 are configured to rotate about the center of the hub relative to the outer ring 105 to displace the radial tensioning arms 120 substantially linearly in a radial direction to and from the central hub 104. The outer ring 105 may be mounted with to a back plate (not depicted) to contain a tensioning mechanism disposed with the central hub 104. Screws 106 may be used to rigidly affix the outer ring 105 to a back plate. Of course, rivets, welds, or the like may also be used. The radial displacement of the radial tensioning arms 120, as controlled by the tensioning handle 115 may be used for clamping the traction pads 125 against a tread surface of a tire, as further depicted in FIGS. 1B and 2B, to improve the tire's traction.

Figure 1B:
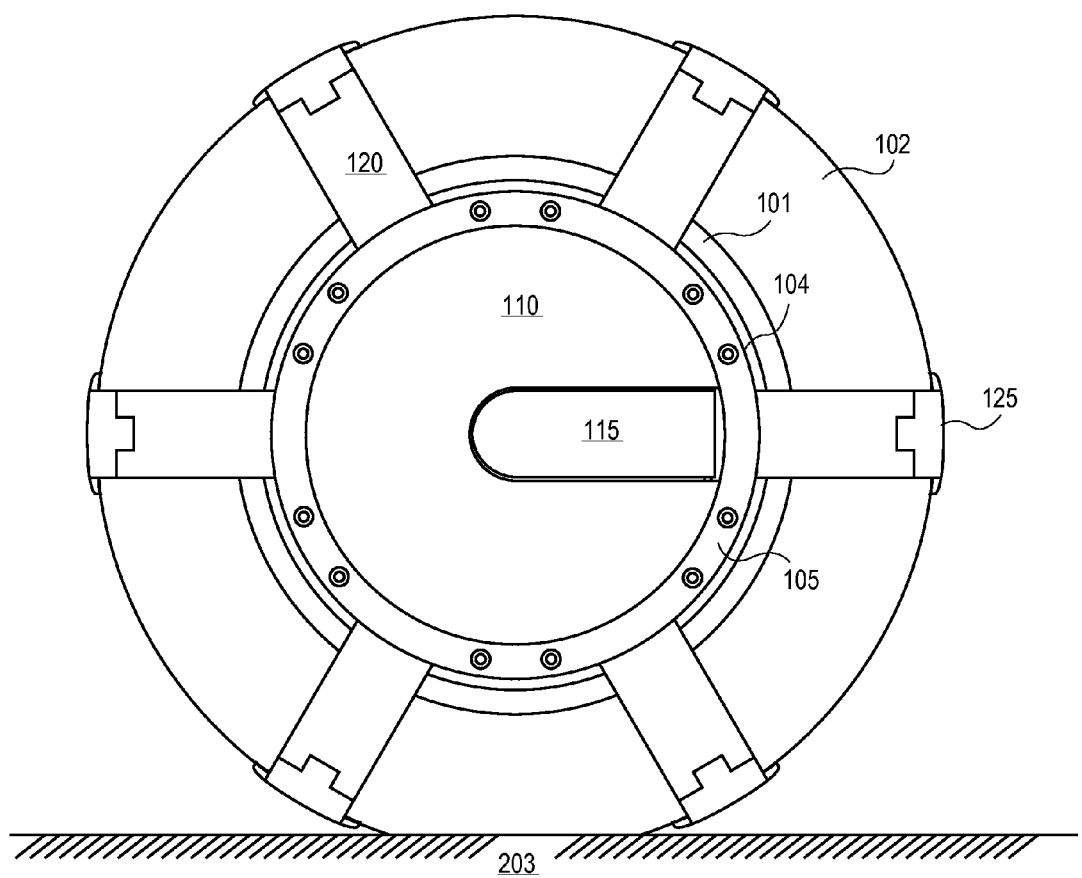
FIG. 1B depicts the tire traction device depicted in FIG. 1A installed on a wheel, in accordance with an embodiment of the present invention.

FIG. 1B depicts the tire traction device illustrated in FIG. 1A in an installed state (e.g., tension clamped to a tire), in accordance with an embodiment of the present invention. As shown in FIG. 1B, the central hub 104 is disposed adjacent to a wheel 101 with the radial tensioning arms 120 extending beyond the outer circumference of the central hub 104 to make contact with the outer circumference of the tire 102. As discussed further elsewhere herein, tensioning of the radial tensioning arms 120 is used to clamp the tire traction device 100 onto the tire 102. As such, the tire traction device 100 need not contact the wheel 101. While the exemplary embodiment depicted in FIG. 1B includes six radial tensioning arms 120, embodiments including as few as three radial tensioning arms 120 are also possible. The upper bound on the number of radial tensioning arms 120 is limited only be the dimensions of each radial tensioning arm, and the size of the tire 102. However, the plurality of radial tensioning arms 120 are preferably spaced apart about the central hub 104 with an angular spacing between adjacent radial tensioning arms 120 sufficient large to accommodate a patch of the tire 102 contacting the ground 203 (i.e., tire contact patch). Such an angular spacing enables adjacent radial tensioning arms 120 to straddle the contact patch during install and/or removal of the tire traction device 100, which eases installation.

Generally, the plurality of radial tensioning arms 120 may have any angular arrangement about central hub 104 to provide tension, when installed, about the circumference of a tire traction device on a tire. In a particular embodiment, the plurality of radial tensioning arms 120 is symmetrically arranged about central hub 104. In preferred embodiments, the tire traction device 100 includes five to eight radial tensioning arms 120. In the exemplary embodiment depicted in FIGS. 1A and 1B, the tire traction device 100 includes six radial tensioning arms 120 illustrating the preferred embodiment including an even number of arms configured with each one of the radial tensioning arms 120 directly opposing another of the radial tensioning arms 120. A first and second radial tensioning arm 120 on opposite sides of the central hub 104 with the arms extending from the central hub 104 in opposite directions is beneficial in transmitting tension across the diameter of the tire 102.

Figure 2A:
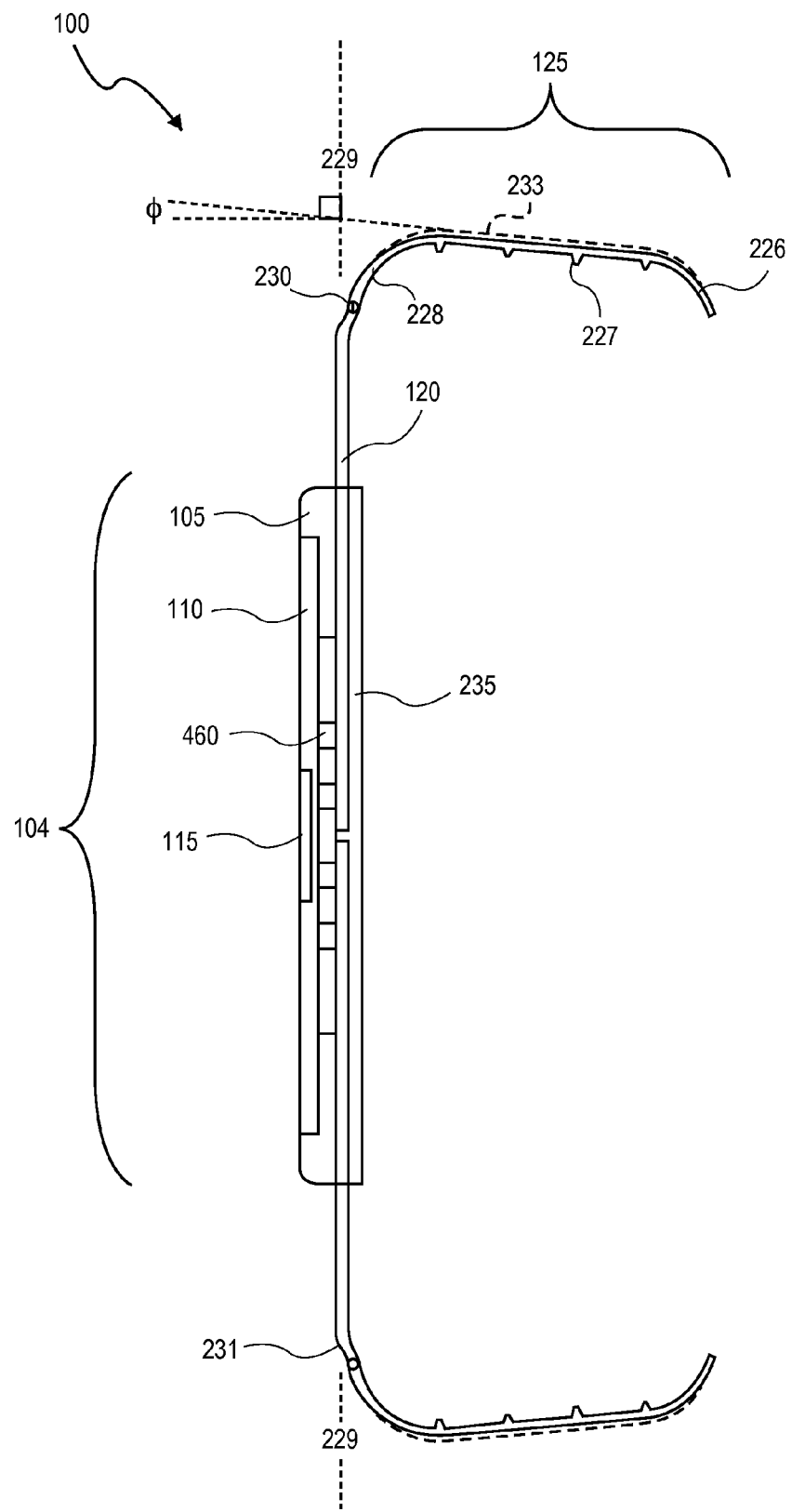
FIG. 2A is a cross-sectional view illustrating a depth of the tire traction device depicted in FIG. 1A, in accordance with an embodiment of the present invention.

FIG. 2A is a cross-sectional view illustrating a cross-section passing through the cover plate 110 of the tire traction device depicted in FIG. 1A, in accordance with an embodiment of the present invention. As shown, the fraction pad 125 is cantilevered from the radial tensioning arms 120, away from the plane 229 of the radial tensioning arms 120. The fraction pad may be cantilevered nominally orthogonal to the plane 229 or, optionally, the traction pad may include 5-10 degrees of a canting ($\phi$) beyond orthogonal to the plane 229. Canting ($\phi$) may provide a tension preload to better hold a tire when the radial tensioning arms 120 are drawn toward the central hub 104. In the depicted embodiment, the fraction pad 125 includes a first curved inner sidewall contact 226 and a second curved outer sidewall contact 228. Between the curved sidewall contact portions, the traction pad 125 includes a ground gripping traction surface 233. In particularly advantageous embodiments where the traction pad 125 is made of a plastic, such as polyurethane, the ground gripping traction surface 233 may be molded into any desired tread pattern. In the depicted embodiment, the traction pad 125 further includes a tire gripping traction surface 227 on a side opposite the ground gripping traction surface 233. Tire gripping traction surface 227 may advantageously prevent slippage between a tire and the tire traction device 100.

Figure 2B:
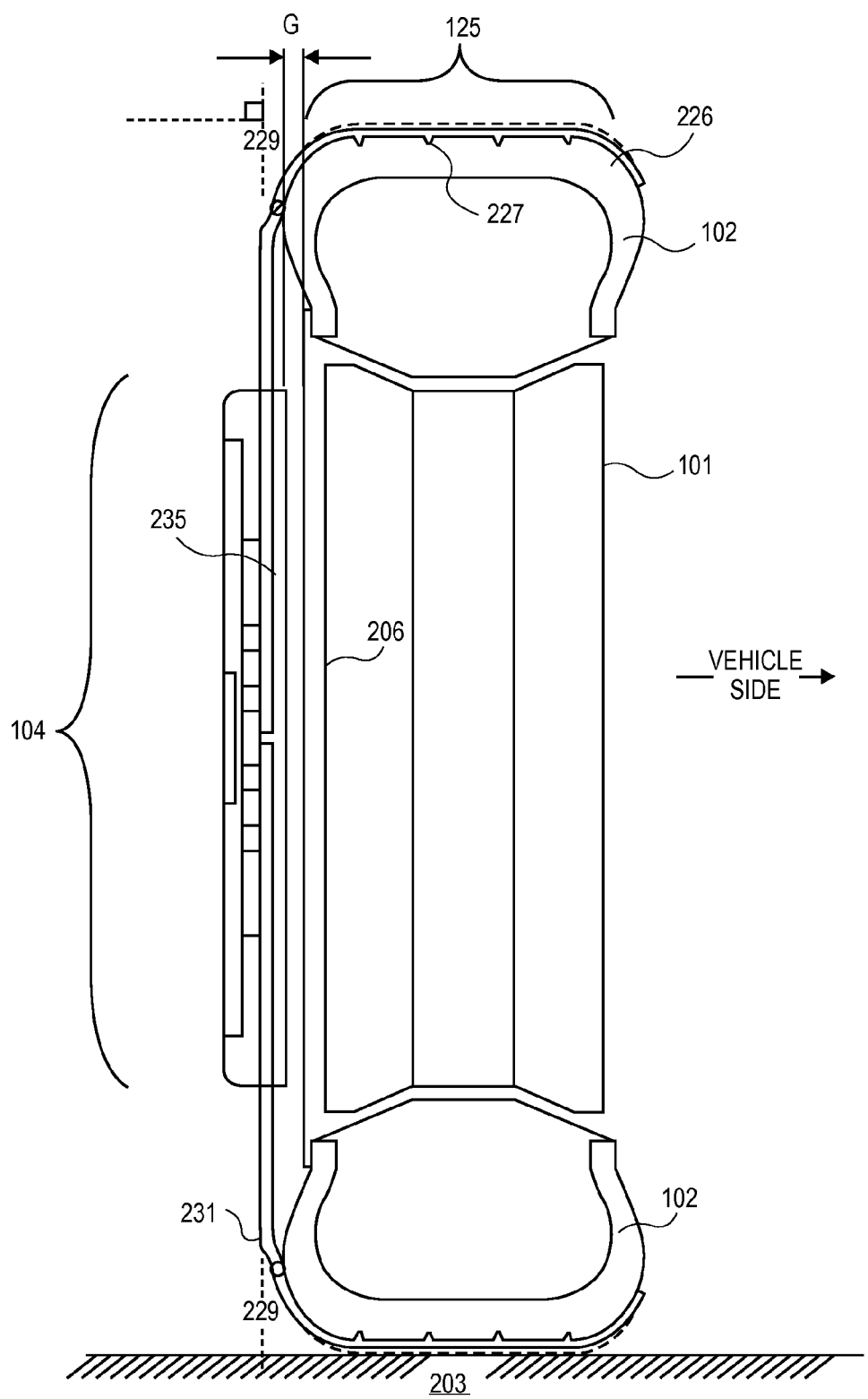
FIG. 2B is a cross-sectional view illustrating a depth of the tire traction device depicted in FIG. 1B, in accordance with an embodiment of the present invention.

As further depicted in FIG. 2A, the central hub 104 is in the plane 229 with the radial tensioning arms 120 extending from between the cover plate 110 and back plate 235. As illustrated, the outer ring 105 is aligned to the back plate 235 to hold the radial tensioning arms 120 along the plane 229 whether or not the radial tensioning arms 120 are under tension. As discussed elsewhere herein, because the radial tensioning arms 120 are rigid bodies capable of supporting their own weight, the plane 229 as defined by the central hub 104 is relatively constant between the uninstalled (relaxed) and installed (tensioned to a tire) states, as depicted in FIGS. 2A and 2B. Rigidity along the plane 229 helps to provide easy installation of the tire traction device 100 relative to a conventional cable or chain based system which will collapse under its own weight.

FIG. 2B is a cross-sectional view illustrating the tire traction device depicted in FIG. 1B in the installed state, in accordance with an embodiment of the present invention. As shown, the central hub 104 is offset from the wheel 101 such that a gap (G) is present between the back plate 235 and the outer wheel face 206. The gap (G) may advantageously prevent contact between the central hub 104 (e.g., back plate 235) and the outer wheel face 206 and/or prevent contact between the radial tensioning arms 120 and the outer wheel face 206. In the exemplary embodiment, to facilitate a sufficiently large gap (G) the radial tensioning arms 120 are formed (e.g., molded, or machined) to include an offset 231. Alternatively, the traction pad 125 may include a similar offset, while still other embodiments include no such offset.

FIG. 2B further illustrates the inner sidewall contact 226 in contact with an inner sidewall of the tire 102. The inner sidewall contact 226 advantageously facilitates clamping of the tire traction device 100 to the tire 102. However, because the radial tensioning arms 120 are extendable from the central hub 104 to a point beyond the outer circumference of the tire 102 which clears the inner sidewall contact 226, installation of the tire traction device 100 remains easy. The tire gripping traction surface 227 is in contact with the tread surface of the tire 102 and, as further shown, the canting ($\phi$) of the traction pad 125 is substantially removed upon installing/tensioning the tire traction device 100. The radial tensioning arms 120 and central hub 104 remain aligned along the plane 229 substantially as they are in the uninstalled state depicted in FIG. 2A.

As the tire traction device 100 is not mounted to a portion of the wheel 101, and indeed need not touch any portion of the wheel, attachment of the tire traction device 100 relies on a clamping force generated by the radial tensioning arms 120 against the tread surface of the tire 102. To provide the tensioning force, embodiments of the present invention include a rotatable tensioner. The rotatable tensioner is to provide a source of radially oriented tension force in response to a rotation or torque applied to a rotatable portion of the central hub. As discussed elsewhere herein, the tensioning torque is to be provided by an installer (user) after the radial tensioning arms 120 are positioned around an outer circumference of the tire 102.

Figure 3A:
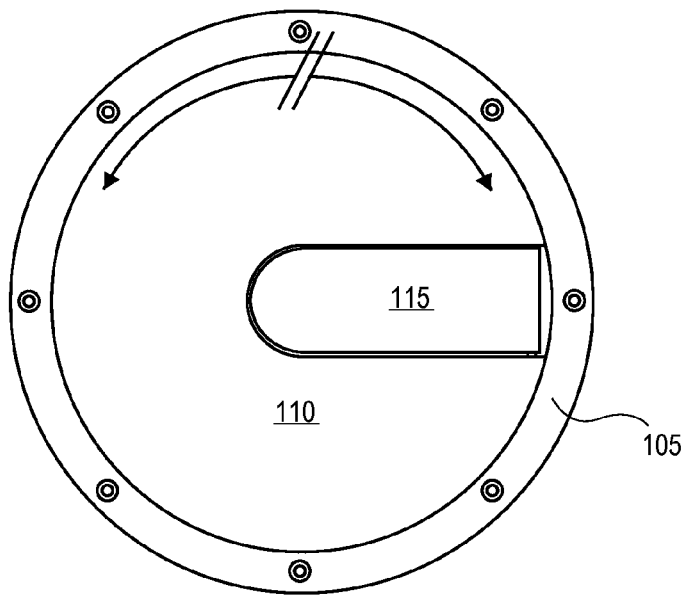
FIG. 3A is a plan view of a rotatable central hub portion with a tensioning handle recessed in a first position, in accordance with an embodiment of the present invention.

FIG. 3A is a plan view of a rotatable central hub portion with a tensioning handle 115 recessed in a first position, in accordance with an embodiment of the present invention. In the first (closed) position, the tensioning handle 115 is contained within the outer ring 105. In a preferred embodiment the tensioning handle 115 is substantially flush with an outer surface of the cover plate 110. In this closed position, the cover plate and/or tensioning handle 115 is locked to the outer ring 105 in a manner which prevents rotation of the rotatable tensioner. For example, a pawl may be engaged upon placing the tensioning handle 115 in the closed position. A keyed lock may be further provided to prevent unauthorized opening of the tensioning handle 115 and/or removal of the tire traction device 100.

Figure 3B:
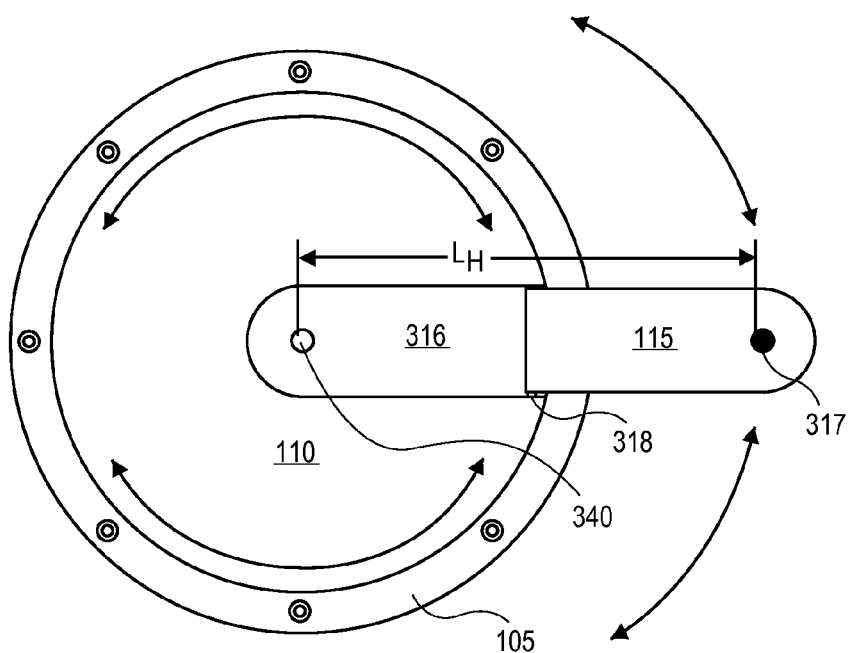
FIG. 3B is a plan view of a rotatable central portion device with a tensioning handle extended in a second position, in accordance with an embodiment of the present invention.

FIG. 3B is a plan view of a rotatable central hub portion with a tensioning handle extended in a second position, in accordance with an embodiment of the present invention. In the second (open) position, the tensioning handle 115 extends from the handle recess 316 to beyond the outer circumference of the outer ring 105, for a handle length ($L_H$) from the center of the cover plate 110 to a tensioning handle knob 317 which provides significant mechanical advantage. In this open position, the cover plate and/or tensioning handle 115 is unlocked from the outer ring 105 in a manner which allows rotation of the rotatable tensioner. In the exemplary embodiment depicted, the cover plate 110 is configured to rotate relative to the outer ring 105 as part of the tensioning handle 115 and rotatable tensioner. For this embodiment, the tensioning handle 115 is coupled to the cover plate 110 at a hinge 318 to transmit a tensioning torque from the tensioning handle knob 317 to the cover plate 110.

Figure 3C:
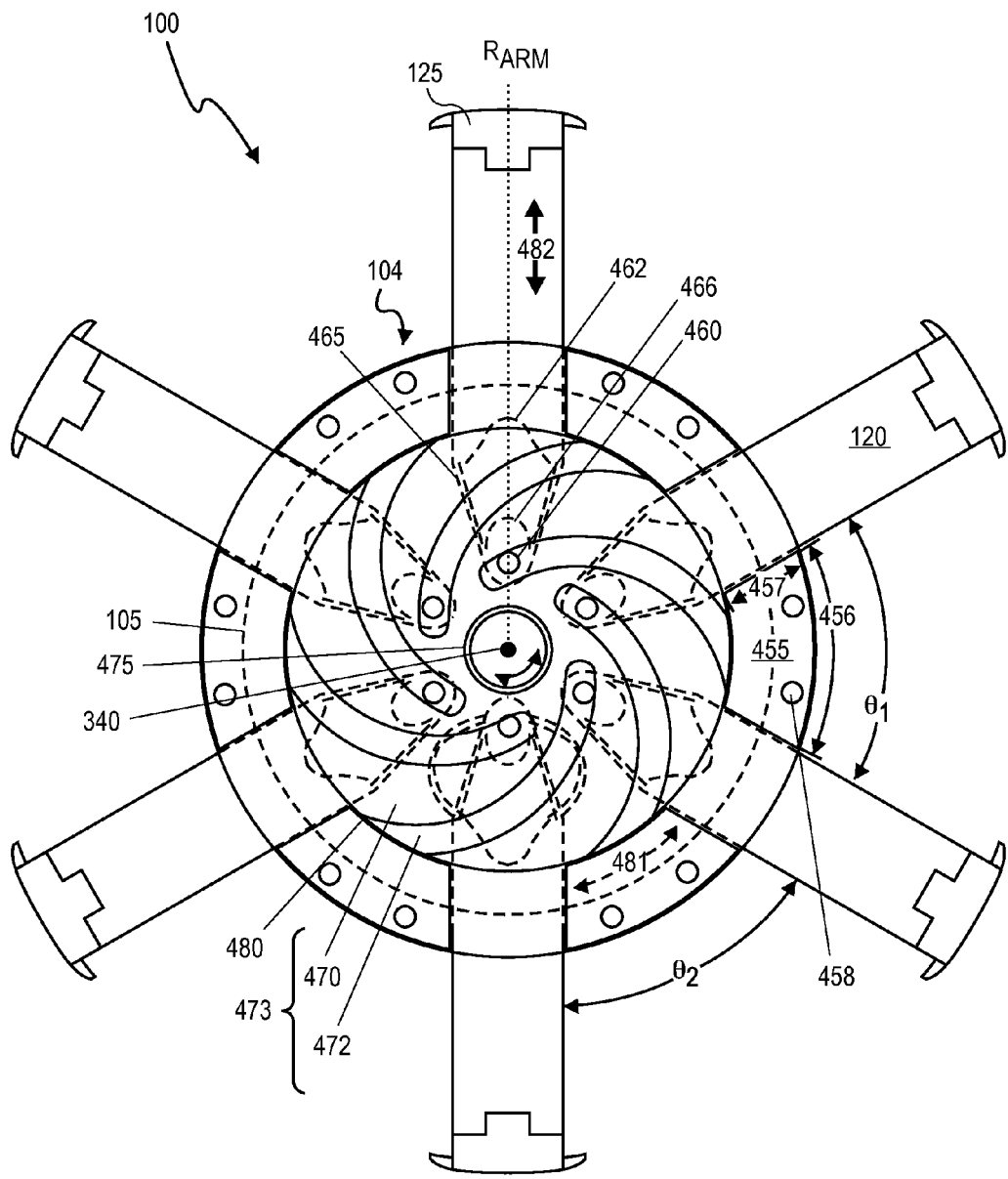
FIG. 3C is a plan view of certain internal components within the tire traction device depicted in FIG. 1A, in accordance with an embodiment of the present invention.

FIG. 3C is a plan view of certain internal components within the tire traction device depicted in FIG. 1A, in accordance with an embodiment of the present invention. FIG. 3C represents a view of the tire traction device 100 through a transparent cover plate 110. As shown, between adjacent radial tensioning arms 120 are arm guides 455. Each arm guide 455 is rigidly affixed to the outer ring 105 demarked by the dashed line, for example by guide screw 458. As such, the central hub 104 has a sufficiently large outer circumference for adjacent radial tensioning arms 120 to be separated from one another by the arm guide 455. The arm guide 455 spans an angular spacing or arc length 456 to define a fixed angle ($\theta$) between adjacent radial tensioning arms 120. In illustrated embodiment, the plurality of radial tensioning arms 120 are evenly spaced apart by a constant angle (e.g., $\theta_1=\theta_2$). The arm guide 455 has a radial length 457 along which the radial tensioning arm 120 is configured to slide as the rotatable tensioner is operated. The arm guides 455 along with the cover and back plates form ports or windows in the side of the central hub 104 into which the radial tensioning arms are fitted. At least the portion of the radial tensioning arm 120 which is adjacent to the arm guide 455 is a rigid body capable of maintaining alignment with the arm radius ($R_{ARM}$) as defined by the arm guides 455 adjacent to opposing sides of each radial tensioning arm 120. For example, a metal or rigid plastic, such as polyurethane, etc., may be used to provide rigidity to the radial tensioning arm 120.

As further shown in FIG. 3C, the central hub 104 includes a portion which is rotatable about a rotation axis 340 that is substantially orthogonal to the tensioning arms 120 and passing through the center of the central hub 104. This rotatable portion includes a plurality of guide vanes 470. Adjacent guide vanes 470 define a vane channel 472 there between. The plurality of guide vanes 470 and vane channels 472 there between combine as a rotatable tensioner 473 with an outer vane circumference 480 and an inner vane circumference 475. The rotatable tensioner 473 is rotatable relative to the outer ring (e.g., parallel to the bi-directional arrow 481). In the exemplary embodiment, the inner surface of the cover plate (not shown) is the rotatable tensioner 473 (e.g., inner surface is molded to include guide vanes 470). For such an embodiment, the rotation of the cover plate relative to the outer ring 105 (FIG. 3B) rotates the rotatable tensioner 473. In alternative embodiments where the rotatable tensioner 473 is contained between the cover plate and back plate (not shown), the cover plate and/or the tensioning handle 115 is coupled to at least one of the outer vane circumference 480, the guide vanes 470, or an inner vane circumference 475 to drive the rotatable tensioner 473.

The radial tensioning arms 120 are each coupled to at least one of the guide vanes 470 or at least one of the vane channels 472. In the exemplary embodiment, each radial tensioning arm 120 includes an arm pin 460 which is seated into a single vane channel 472. The arm pin 460 is configured to slide inside the vane channel 472 as the rotatable portion of the central hub 104 is rotated. For example, an OD of the arm pin may be ⅛" to 3/16" smaller than the width of the vane channel 472. Because the arm guides 455 maintain the radial tensioning arms 120 in alignment with a substantially fixed radial position (e.g., aligned to the radius $R_{ARM}$) and because the vane channel 472 is curved as it emanates from the rotational axis 340 (e.g., spiraled), the radial tensioning arms 120 retract or extend along their respective radii (e.g., arrow 482) as the arm pin 460 slides within the vane channel 472 in response to rotation of the rotatable tensioner 473. In the exemplary embodiment, each of the plurality of vane channels 472 making up the rotatable tensioner 473 follow the same curve so that all of radial tensioning arms 120 retract or extend in unison and to a same position in response to rotation of the rotatable tensioner 473.

As depicted the vane channels 472 may adhere to a golden ratio or Fibonacci relationship. While any number of mathematical relationships may describe the vane channels 472, the golden ratio or Fibonacci sequence provides the advantage of a rapidly changing radius near the rotational axis 340 (where little to no tension load is to be expected with the radial tensioning arms 120 nearly fully retracted as in a storage state) to a gradually changing radius distal from the rotational axis 340 (where significant clamping tension is to be expected with the radial tensioning arms 120 nearly fully extended as in an installed state). A constant rotation of the rotatable tensioner 473 in a first direction (e.g., counter-clockwise) will initially relatively rapidly extend of the radial tensioning arms 120 and then more slowly extend the arms as the outer tire circumference is approached. Similarly, a constant rotation of the rotatable tensioner 473 in a second direction (clockwise) will initially relatively slowly retract the radial tensioning arms 120 when tensioning forces are highest and then more rapidly retract the arms once past the point of typical installations for rapid stowage of the tire traction device 100. In further embodiments, a ratcheting mechanism (gear teeth and pawl) may be adapted to either the inner vane circumference 475 or the outer vane circumference 480 to enable the tensioning handle 115 to be first rotated to convenient working position and then ratcheted to tension (clockwise rotation) or release (counter-clockwise rotation).

Figure 3D:
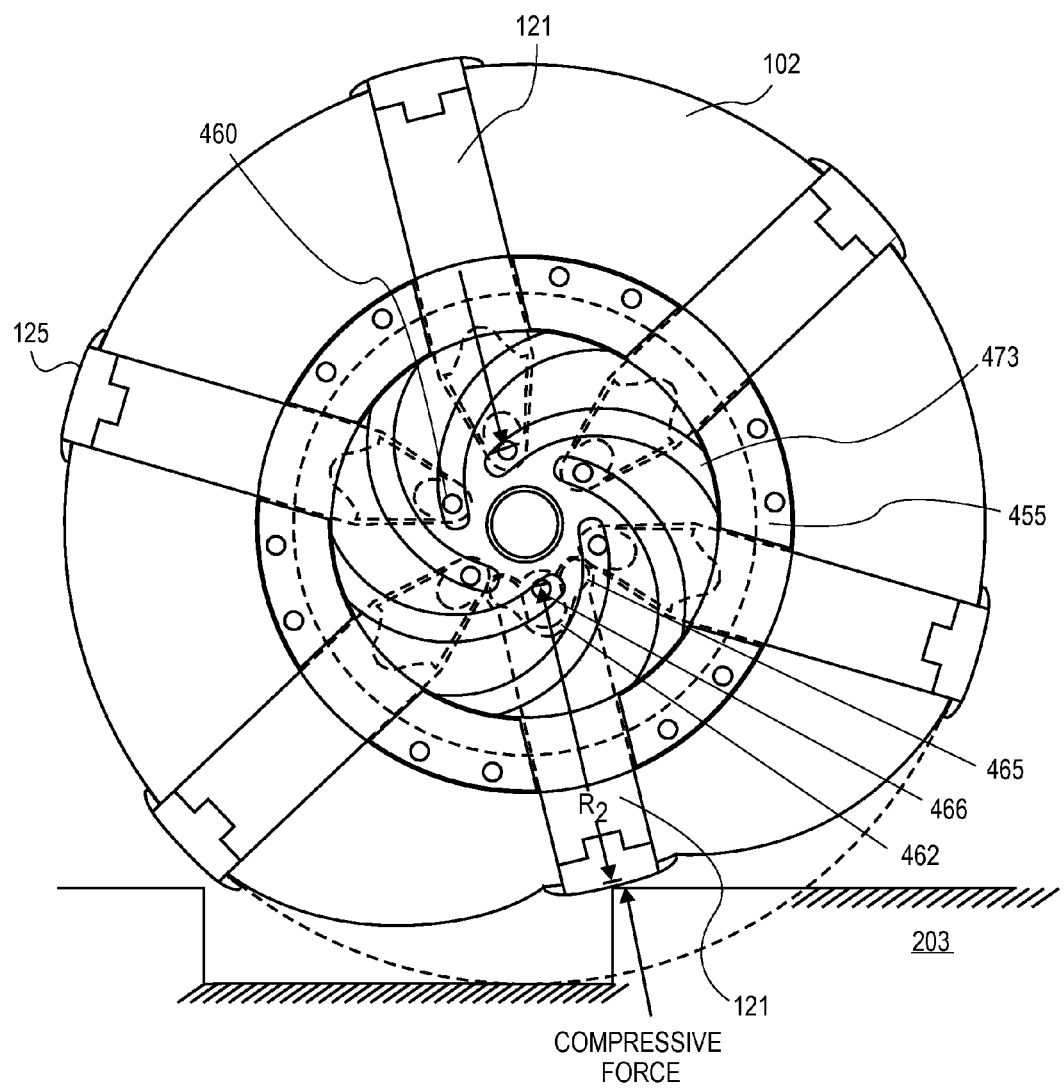
FIG. 3D is a plan view of certain internal components within the tire fraction device depicted in FIG. 3B when installed on a tire and in operation, in accordance with an embodiment of the present invention.

FIG. 3D is a plan view of certain internal components within the tire traction device depicted in FIG. 3B when installed on a tire and in operation, in accordance with an embodiment of the present invention. As described elsewhere herein, the radial tensioning arms 120 and central hub 104 are each rigid bodies which do not significantly deflect under their own weight. In particular embodiments, the radial tensioning arms 120 are coupled to an arm tie 465 at an end opposite the traction pad 125 so that destructive shear forces are not incurred as the wheel periodically rolls over a radial tensioning arm 120. The arm tie 465 is formed of a material and/or with dimension capable of compressing in the radial direction a nominal amount to accommodate deformation of the tire 102. For example, in FIG. 3D, impact with the ground 203 causes a portion of the tire 102 to compress a first radial tensioning arm 121 to a radial length R2 while a second radial tensioning arm 122 remains at a nominal tensioned radial length R1. Because the rotatable tensioner 473 is locked (e.g., tensioning handle 115 in closed position) and the other tensioning arms 120 of the plurality remain under tension, the rotatable tensioner 473 is not rotated by the compressive ground force. Instead, the arm tie 465 undergoes deformation to effectively provide a temporary shortening of the first radial tensioning arm 121 while the remaining radial tensioning arms 120 maintain a tension force to keep the tire traction device 100 clamped to the wheel. Thus, each arm tie 465 allows the first radial tensioning arm 121 to compress independently from the second radial tensioning arm 122.

With the flexible arm tie 465 contained within the confines of the central hub 104, the radial tensioning arms 120 remain at a substantially constant angular position relative to an outer circumference of the central hub 104 as they are extended and retracted. As such, the advantages of a rigid radial tensioning arm 120 (e.g., easy installation as a unitized rigid body, uniformly spaced tensioning arms) and the advantages of a flexible radial tensioning arm (e.g., deformation under operating stress) may be both achieved to excellent effect.

Figure 3E:
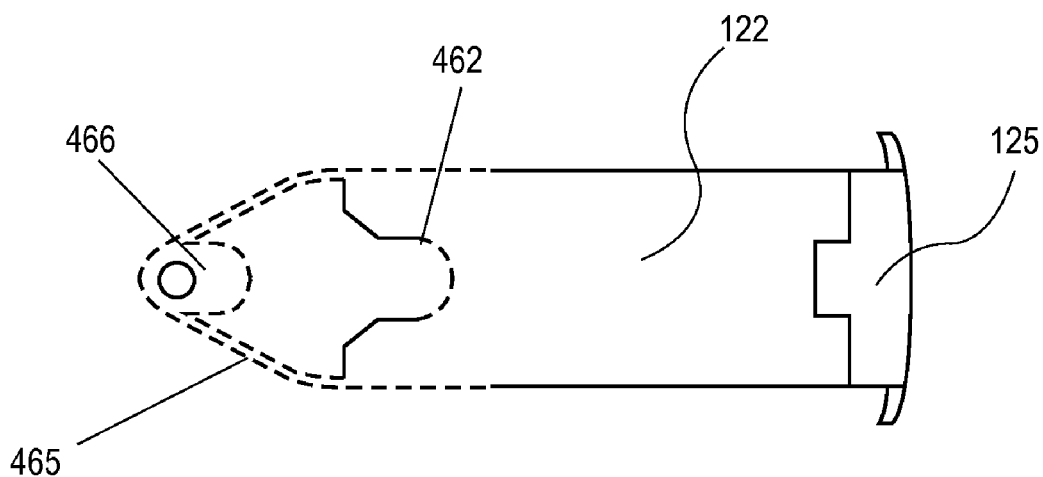
FIG. 3E is a plan view of a tensioning arm in a nominal state, in accordance with an embodiment of the present invention.
Figure 3F:
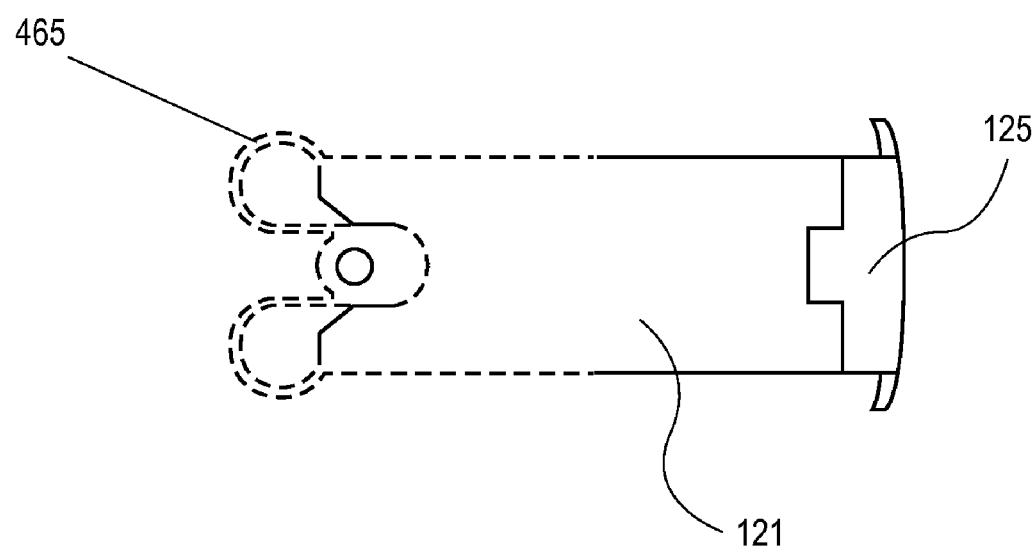
FIG. 3F is a plan view of a tensioning arm in a compressed state, in accordance with an embodiment of the present invention.

The arm tie 465 is to provide a flexible coupling between the first radial tensioning arm 121 and the arm pin 460 with good tensile strength for the clamping tension force but deformable in under radial compression. In the preferred embodiment, the arm tie 465 is a cable formed from plastic, metal, or the like. For the rigid radial tensioning arm 120 to maintain contact (e.g., along portion of arm drawn in dashed line in FIGS. 3C-3E) with the arm guides 455 when fully extended (e.g., along radius $R_1$) and yet enable a significant amount of displacement under compression (e.g., along radius $R_2$), the radial tensioning arms 120 may further include an arm pin relief 462 to receive the arm pin 460 and/or arm tie coupling 466. FIG. 3E is a plan view of a radial tensioning arm in a nominal state and FIG. 3F is a plan view of a radial tensioning arm in a compressed state, in accordance with an embodiment of the present invention. As shown in FIG. 3F, with the radial tensioning arm 122 in the compressed state, the arm tie 465 deforms and the arm pin relief 462 receives the arm tie coupling 466 (which is affixed to an arm pin (not depicted). With the first radial tensioning arm 121 in the nominally tensioned state (FIG. 3E), the arm tie 465 is extended about 2" from the fully compressed state of the second radial tensioning arm 122.

Figure 4A:
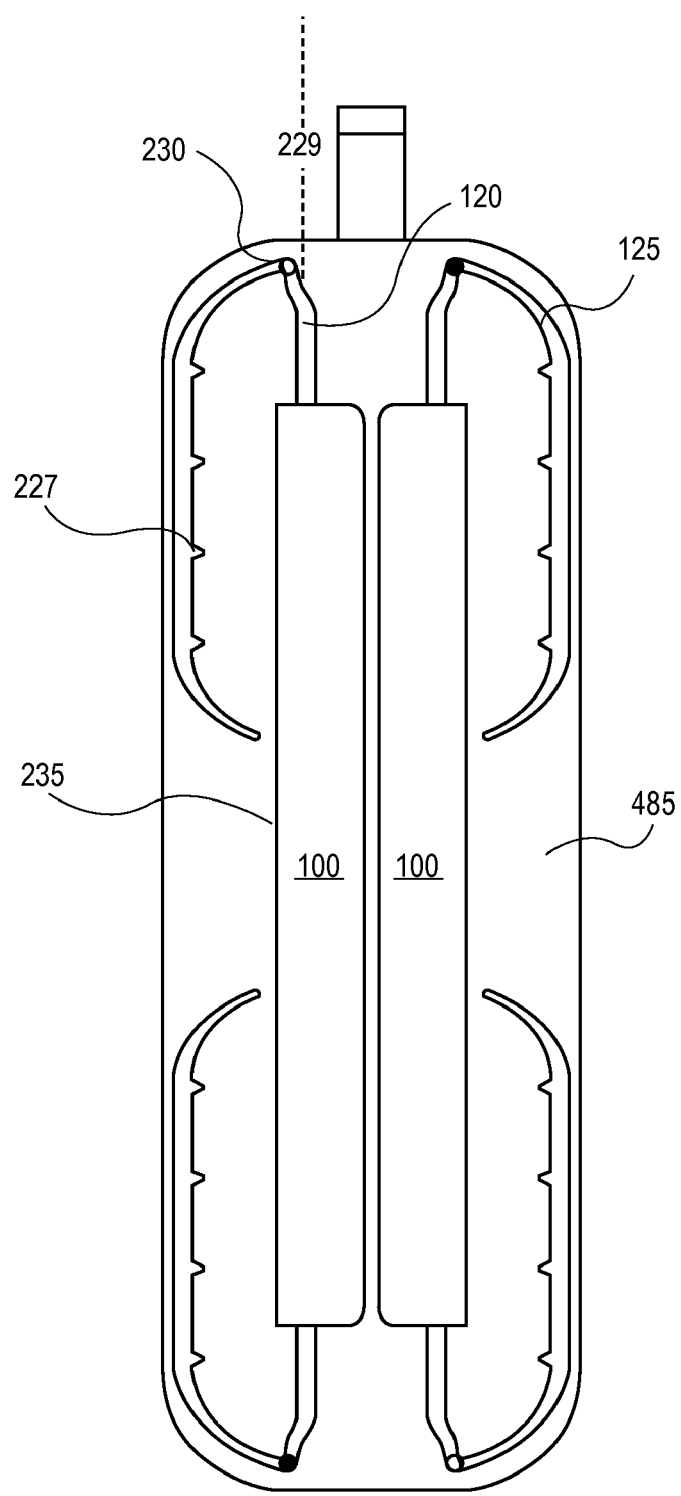
FIG. 4A is a plan view of a pair of tire traction devices folded for storage, in accordance with an embodiment of the present invention.

FIG. 4A is a plan view of a pair of tire traction devices 100 folded for storage, in accordance with an embodiment of the present invention. As shown the traction pads 125 may be coupled to the radial tensioning arms 120 with a hinge 230. The hinge 230 allows a traction pad 125 to fold beyond the nominally orthogonal (relative to the plane 229) position to dispose the tire gripping traction surface 227 adjacent to the back plate 235 of a tire traction device 100. As such, with the radial tensioning arms 120 fully retracted, the pair of tire fraction device 100 may be disposed conveniently in a storage container 485.

Figure 4B:
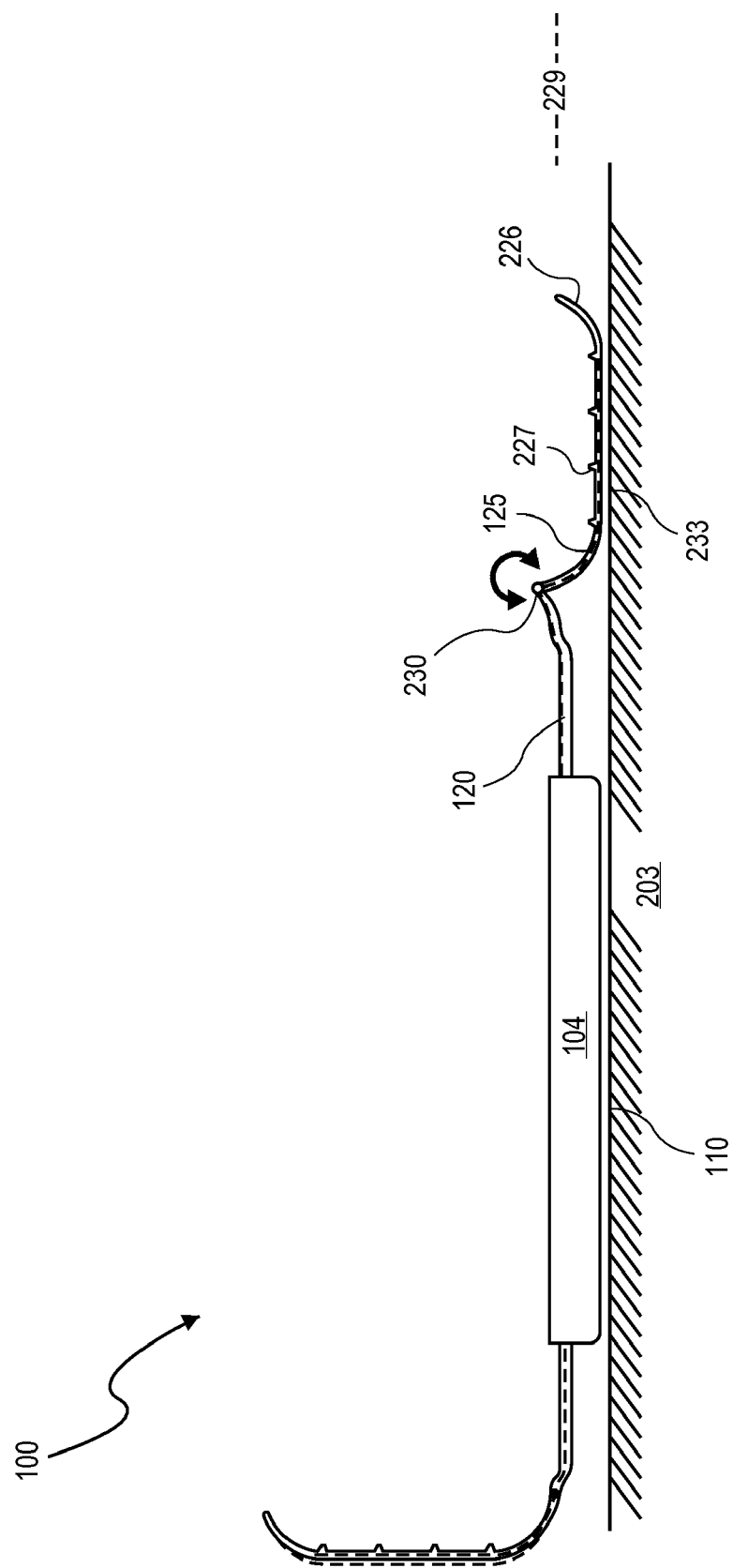
FIG. 4B is a side view of a tire traction device folded for removal from a tire, in accordance with an embodiment of the present invention.

FIG. 4B is a side view of a tire traction device folded for removal from a tire, in accordance with an embodiment of the present invention. As shown, the hinge 230 may further be configured to allow the traction pad 125 to rotate about the hinge axis from the cantilevered (orthogonal) position to extend outward from the radial tensioning arms 120 along a plane substantially parallel to the plane 229 of the radial tensioning arms 120. In this configuration, both the cover plate 110 and the ground gripping traction surface 233 are disposed on the ground 203. Such a mode is convenient for removal of the tire traction device 100 in the event that the traction pad 125 is between a resting wheel and the ground 203. After extending the radial tensioning arm 120, the arm may be rotated about the hinge 230 as depicted to allow the resting wheel to roll off the traction pad 125.

Figure 4C:
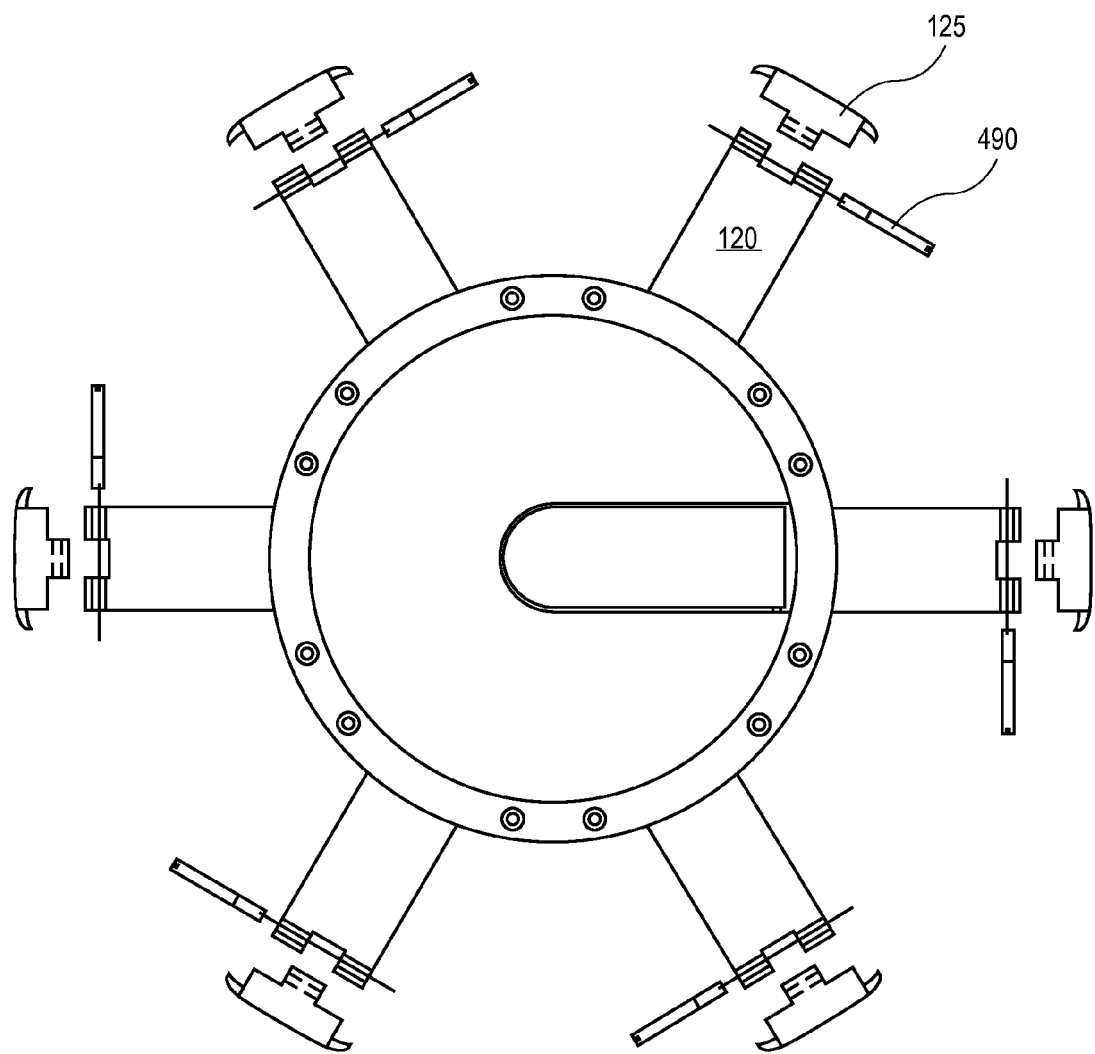
FIG. 4C is a plan view of a tire traction device illustrating a removable traction pad coupling, in accordance with an embodiment of the present invention.

FIG. 4C is a plan view of a tire traction device illustrating a removable traction pad coupling 490, in accordance with an embodiment of the present invention. In the depicted embodiment, the removable traction pad coupling 490 allows the traction pad 125 to be removed from the radial tensioning arm 120 for easy replacement or modification of the traction surfaces. In particular embodiments which employ a hinge 230, the removable fraction pad coupling 490 may further serves as the hinge pin.

Figure 5:
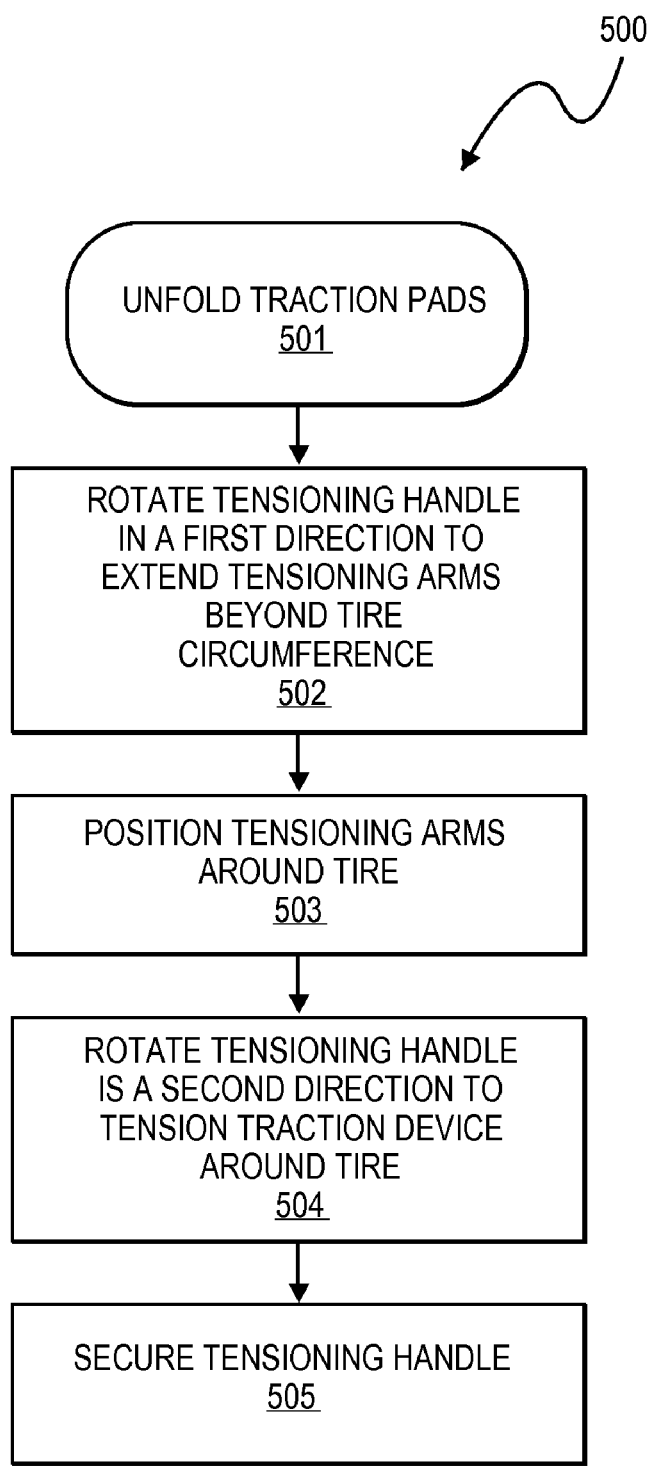
FIG. 5 is a flow diagram illustrating a process of installing a tire traction device, in accordance with an embodiment of the present invention.

FIG. 5 is a flow diagram illustrating a method 500 for installing the tire traction device 100, in accordance with an embodiment of the present invention. The method 500 begins at the operation 501 with unfolding the traction pads (e.g., from the storage state depicted in FIG. 4A). Next, at operation 502, the tensioning handle 115 is rotated in a first direction (e.g., counter-clockwise) to extend the radial tensioning arms beyond the tire circumference. While holding the central hub 104 or radial tensioning arms 120, the tire traction device is then positioned as a unitized body, at operation 503, to have the traction pads 125 adjacent to the tread surface of a tire. For example, the tire gripping traction surface 227 may be disposed against the tire tread surface with the inner sidewall contact 226 facing the inner sidewall of the tire. At operation 504, the tensioning handle is the rotated a second direction, opposite the first, (e.g., clockwise) to tension the traction device around the tire by retracting the radial tensioning arms 120 toward the central hub. The method 500 completes at operation 505 with the tensioning handle 115 being secured (e.g., closed position).

Although the present invention has been described in language specific to structural features and/or methodological acts, it is to be understood that the invention defined in the appended claims is not necessarily limited to the specific features or acts described. For example, many applications may benefit from the tire traction device securing apparatus in accordance with the present invention and one of ordinary skill in the art would recognize the embodiments described as particularly graceful implementations of the claimed invention useful for illustrating the present invention.

What is claimed is:

1. A tire traction device, comprising:
   a central hub comprising:
      arm guides disposed between an outer ring and a backing plate to define tensioning arm openings at fixed angular positions about the central hub; and
      a rotatable tensioner rotatable relative to the outer ring, the rotatable tensioner comprising curved guide vanes defining curved vane channels;
   at least three radial tensioning arms extending outward from the central hub and passing through the tensioning arm openings, the radial tensioning arms coupled to radially compressible portions that are contained within the central hub and movably affixed into the curved vane channels; and
   a traction pad coupled to each of the radial tensioning arms at an outer end opposite the radially compressible portion, wherein the radial tensioning arms further comprise rigid bodies spanning a radial distance from an outer diameter of the central hub to the traction pad, the rigid bodies being movable in a radial direction relative to the central hub with a rotation of the rotatable tensioner to provide a tensioning of the traction pads against a tire.

2. The tire traction device of claim 1, wherein the curved vane channels emanate from a center of the central hub to form a spiral pattern.

3. The tire traction device of claim 1, wherein each of the radially compressible portions includes a pin seated in one of the curved vane channels, the seated pin to slide within the curved vane channel and remain in a substantially constant angular position relative to an outer circumference of the central hub while being displaced radially in response to a rotation of the rotatable tensioner about an axis passing through a center of the central hub.

4. The tire traction device of claim 1, wherein the traction pad is a polyurethane material providing a ground gripping surface and a tire gripping surface opposite the ground gripping traction surface.

5. The tire traction device of claim 4, wherein a traction pad hinge couples the traction pad to the radial tensioning arm to allow a gripping surface of the traction pad to rotate from the cantilevered position and extend radially outward from the traction pad hinge in an open position.

6. The tire traction device of claim 5, wherein the traction pad is rotatable around the traction pad hinge to move from the cantilevered position to extend radially inward from the traction pad hinge and fold over a portion of the radial tensioning arm in a closed position.

7. The tire traction device of claim 1, wherein the traction pad is cantilevered from the radial tensioning arms to wrap around a portion of a tire tread surface and wherein the traction pad is removably coupled to each of the radial tensioning arms.

8. The tire traction device of claim 7, wherein the traction pad has first and second curved portions, the first curved portion configured to wrap around an outer edge of a tire and the second curved portion configured to wrap around an inner edge of the tire.

9. The tire traction device of claim 1, wherein the central hub further comprises:
   a tensioning handle coupled to the rotatable tensioner, wherein the tensioning handle is moveable between a recessed position, in which the tensioning handle is disposed within the outer ring, and an extended position, in which the tensioning handle extends radially beyond the outer ring.

10. The tire traction device of claim 1, wherein the guide vanes form a portion of the cover plate.

11. The apparatus of claim 1, wherein each radially compressible portion has a radial length less than the radius of the central hub to remain disposed within the central hub when the traction pads are tensioned against a tire.

12. The apparatus of claim 11, wherein each the radially compressible portions comprise a cable coupled to one of the rigid bodies and coupled to a pin seated within a curved vane channels.

13. The apparatus of claim 12, wherein the rigid body includes a relief at the end coupled to the radially compressible portion, the relief sized to accommodate the pin when the radially compressible portion is fully compressed.

* * * * *